(12) United States Patent
Chang et al.

(10) Patent No.: US 6,424,834 B1
(45) Date of Patent: Jul. 23, 2002

(54) PRECISION HARD HANDOFF METHOD USING PILOT BEACON DISTRIBUTORS

(75) Inventors: Chu-Rui Chang, Plano; Meng Yee, Richardson, both of TX (US)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/365,262

(22) Filed: Jul. 31, 1999

Related U.S. Application Data (60) Provisional application No. 60/118,272, filed on Feb. 2, 1999.

(51) Int. Cl.⁷ .................................................. H04Q 7/20
(52) U.S. Cl. ....................................... 455/436; 455/439
(58) Field of Search ................................ 455/434, 436, 455/437, 438, 439, 440, 443, 444, 561, 562, 11.1, 448, 25; 370/331, 334, 335, 336, 342

(56) References Cited

U.S. PATENT DOCUMENTS

| | | | | |
|---|---|---|---|---|
| 5,455,962 A | | 10/1995 | Kotzin | 455/33.1 |
| 5,594,718 A | * | 1/1997 | Weaver, Jr. et al. | 370/331 |
| 5,926,470 A | * | 7/1999 | Tiedemann, Jr. et al. | 370/334 |
| 5,999,816 A | * | 12/1999 | Tiedemann, Jr. et al. | 455/436 |
| 6,009,328 A | * | 12/1999 | Muszynski | 455/442 |
| 6,075,989 A | * | 6/2000 | Moore et al. | 455/436 |
| 6,134,440 A | * | 10/2000 | Black | 455/436 |
| 6,151,512 A | * | 11/2000 | Chheda et al. | 455/562 |
| 6,208,862 B1 | * | 3/2001 | Lee | 455/442 |

* cited by examiner

Primary Examiner—Nay Maung
Assistant Examiner—Jean A Gelin
(74) Attorney, Agent, or Firm—Haynes & Boone, LLP (57) ABSTRACT

A method and system for providing a precision hard handoff between two networks is disclosed. The two networks include a first wireless communication system for serving a defined area, such as a campus, at a first frequency and a second wireless communication system adjacent to the first system and operating at a second frequency. A first pilot beacon distributor is positioned at a transition point of the campus for directionally transmitting a first pilot beacon signal into the campus. When a mobile unit operating on the second frequency crosses the transition point into the campus, it receives the first pilot beacon signal and it shifts operation to the first frequency.

37 Claims, 4 Drawing Sheets

PRECISION HARD HANDOFF METHOD USING PILOT BEACON DISTRIBUTORS

CROSS REFERENCE

This application claims the benefit of provisional application assigned U.S. serial No. 60/118,272 filed on Feb. 2, 1999.

BACKGROUND

The present invention relates generally to wireless communication networks, and more particularly, to a system and method for generating a plurality of pilot beacons to facilitate a precise hard handoff.

The success of code division multiple access (CDMA) wireless communication in the recent years has brought quality service to many mobile users. With the advancement of the technology and the demand of the market, it is foreseeable that more private CDMA networks will be installed in addition to existing public CDMA networks such as the Sprint PCS network by Sprint, Inc. Major corporations or institutes may have the desire to establish private CDMA networks on their campuses to provide high quality and more economical wireless service to their employees or guests. However, such campuses are often heavily populated with mobile units such as cellular phones. To worsen the situation, the size of the campus is relatively small so that it may reside entirely in one cell of a larger network.

One major feature of CDMA technology that differentiates it from other wireless communication technologies is its use and reuse of specific frequencies. Although it is a technical edge over other communication technologies such as time division multiple access, it makes the campus scenario described above an undesirable "hot spot" since a comparatively large number of users may have to be serviced by one sector of the cell using the same frequency. This possible "traffic jam on the communication highway" reduces the quality of the wireless services provided to the mobile units on the campus.

As a result, it may be desirable for a private CDMA network on a campus to use a carrier frequency different from the surrounding networks. And to further improve the quality of the services on the campus, numerous micro cells may be used, each of which having a comparatively small radius (typically less than one hundred meters). In contrast, a "macro cell" for a standard CDMA network surrounding the campus may have a radius around 3 to 5 kilometers. Consequently the signal interferences between the surrounding network and the private network on the campus, as well as the signal interferences among the micro cells in the private network, are greatly reduced because different carrier frequencies are employed. However, for providing continuous wireless service to a mobile unit (MU) when it enters or leaves the campus, a hard handoff must occur between the private network and the outside network.

There are several difficulties associated with the above described hard handoff. For one, an active wireless service such as an ongoing telephone call should not be interrupted or dropped due to the change of the carrier frequency when carrying out such a hard handoff. In addition, the service provided should be properly billed, potentially to different service providers, according to the use of the service of the different networks. Thus, for example, when a mobile user exits the campus, he should be able to continue his conversation on the MU, even though the MU needs to switch from the private network to the surrounding network. Such a transition must be performed in a relatively small border area between the campus and outside, and vice versa when the mobile user enters the campus.

Unfortunately, various problems exist for precisely performing the handoff at the border area. First, soft handoffs do not work well in this situation. It is known in the art that the soft handoff for CDMA technology has been studied and developed greatly. But in order to take advantage of a soft handoff, only one carrier frequency can be involved. Soft handoffs are thus most useful for switching the wireless service between two Base Transmission Stations (BTS) using the same carrier frequency. For the situation discussed above, since at least two carrier frequencies are involved, the soft handoff scheme would be hard to deploy. For example, in order to use the soft handoff scheme, as it is known in the art, the only alternative is to configure a tier of cells for providing a soft handoff zone between the campus and the surrounding network. This would dramatically increase the cost of installing such a private network since additional, expensive infrastructure equipment must be installed. Moreover, significant redesign of the surrounding network is also required to accommodate this change, which adds further costs to the private network. Therefore, a soft handoff is economically infeasible and a hard handoff design is needed.

There is still a problem associated with using a conventional hard handoff scheme, such as a round trip delay handoff, in a small area. As it is known in the art, the round trip delay handoff can detect the motion of a MU only when it moves for more than 250 meters. This does not work for the campus scenario mentioned above because the campuses themselves may have a radius of less than 500 meters. The handoffs thus can not be guaranteed to happen at or near the entrance or the exit of the campus since the border area between the campus and the surrounding network is probably only about 25 meters in length.

Therefore, what is needed is an economical and reliable system and method to direct a precision hard handoff to accommodate the carrier frequency change between a relatively small private CDMA network and its surrounding networks.

SUMMARY

In response to the above described problems and difficulties, a technical advance is provided by a unique method and system for providing a precision hard handoff between two networks. In one embodiment, the two networks include a first wireless communication system for serving a defined area, such as a campus, at a first frequency and a second wireless communication system adjacent to the first system and operating at a second frequency. A first pilot beacon distributor is positioned at a transition point of the campus for directionally transmitting a first pilot beacon signal into the campus. When a mobile unit operating on the second frequency crosses the transition point into the campus, it receives the first pilot beacon signal and it shifts operation to the first frequency.

In some embodiments, a second pilot beacon distributor is also positioned at the transition point for directionally transmitting a second pilot beacon signal away from the campus. As a result, when a mobile unit operating on the first frequency crosses the transition point out of the campus, it receives the second pilot beacon signal and it shifts operation to the second frequency.

In another embodiment, a plurality of pilot beacon distributors are installed at each entrance or exit of a campus and are connected by fiber optical cables to a radio frequency (RF) beacon source which may remain at a central location on the campus. Only one beacon source is needed for each carrier frequency covering the entrance or exit area. The pilot beacon distributors have directional beacon antennas that transmit the pilot beacons to help trigger a hard handoff for any MU moving in or out of the campus.

In some embodiments, a first pilot beacon distributor is used to direct hard handoff from a carrier frequency for the private network on the campus, e.g., F1, to a target carrier frequency, e.g., F2, of the outside network for outgoing traffic, and a second pilot beacon distributor is also installed close to the first pilot beacon distributor for steering incoming traffic to hard handoff from F2 to F1.

Some embodiments may provide a directional non-beacon antenna that does not transmit the pilot beacon. The directional non-beacon antenna may be coupled with the above mentioned directional beacon antenna in the pilot beacon distributors. The directional beacon antenna may have a large front-to-back ratio, while the non-beacon antenna may not have a significant front-to-back ratio.

These embodiments prevent a ping-pong phenomenon between the first and the second pilot beacon distributors. For example, a ping-pong phenomenon may occur when both pilot beacon distributors detect the motion of a MU and both decide to trigger a handoff to its target carrier frequency. In this example, the MU will bounce between the two frequencies (F1 and F2) without actually being able to settle on a right one.

These embodiments also prevent call drops from occurring if the signal strength of a target carrier frequency is too weak at the locations where the handoff is desired. For example, a handoff may become unreliable since the target network can not effectively "take over" the service.

These embodiments are also specifically designed to maintain a proper signal-to-noise ratio (SNR). If the SNR under the current carrier frequency changes too fast, it could cause a call drop as well and the handoff can never be completed.

In order to accommodate complex CDMA networks where multiple frequencies are used both for the surrounding network and the private network on the campus, a multiple-beacon generator may also be used. Instead of installing a pilot beacon unit for each frequency, the multiple-beacon generator can produce copies of a pilot beacon at different carrier frequencies.

DESCRIPTION OF THE PREFERRED EMBODIMENTS

The following disclosure provides many different embodiments, or examples, for implementing different features of the invention. Techniques and requirements that are only specific to certain embodiments should not be imported into other embodiments. Also, specific examples of components, signals and network technologies are described below to help clarify the invention. These are, of course, merely examples and are not intended to limit the invention from that described in the claims. For illustration purposes, drawings may not be to scale.

Figure 1:
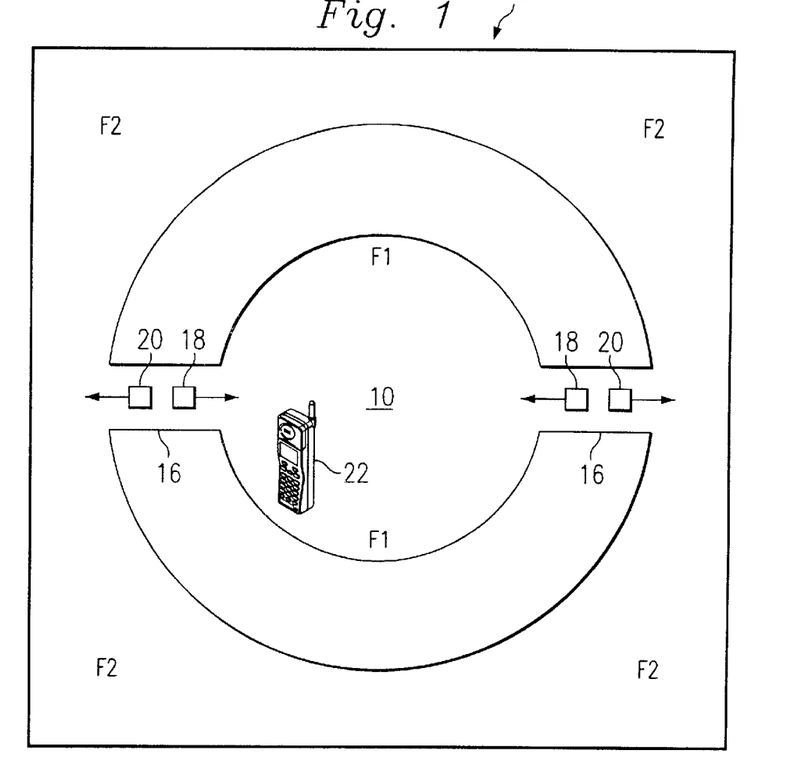
FIG. 1 illustrates a campus having a private CDMA network with a first carrier frequency and a surrounding CDMA network having a second carrier frequency, with pilot beacon distributors installed at the entrance and exit of the campus.

Referring now to FIG. 1, a campus 10 having a private CDMA network is surrounded by an existing CDMA network 12. Two entrances (or exits) 16 are assumed to be the only ways through which a MU can move in or out of the campus 10. For the sake of illustration, it is also assumed that the private CDMA network has a carrier frequency F1, and the surrounding CDMA network 12 has another carrier frequency F2. Two pilot beacon distributors are installed at or near each of the entrances 16, with one inbound pilot beacon distributor 18 directing handoff to the frequency F1 and one outbound pilot beacon distributor 20 directing handoff to the frequency F2. Further, the pilot beacon distributors contain beacon antennas for transmitting pilot beacons. Directional antennas are purposefully used for beacon antennas instead of omni-directional antennas since they can be perceived by the MUs coming from only one direction. With this configuration, once a MU 22 passes through an area covered by an outbound pilot beacon distributor 20, its wireless service is expected to be switched to the frequency F2 of the surrounding network 12. And similarly, if the MU 22 passes through the area covered by the inbound pilot beacon distributor 18, it is to be switched to the frequency F1 of the private network on the campus 10.

The hard handoff is thus expected to happen in the entrance areas 16 so that a mobile user can enjoy the benefit of the private network, which may provide a different wireless service to the MU for a discounted fee or even free of cost. It is also desired that the triggering event occurring at or around the entrances 16 is performed with precision. That is, the precision handoff at the entrances 16 accommodates proper billing and desired services provided by both the private network on the campus 10 and the surrounding network 12.

Figure 2:
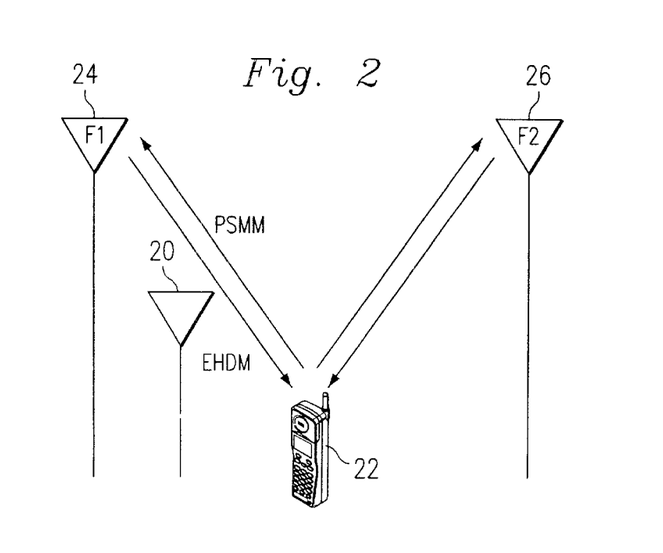
FIG. 2 shows a portion of the hardware configuration in FIG. 1 for facilitating an active hard handoff using one of the pilot beacon distributors.
Figure 3:
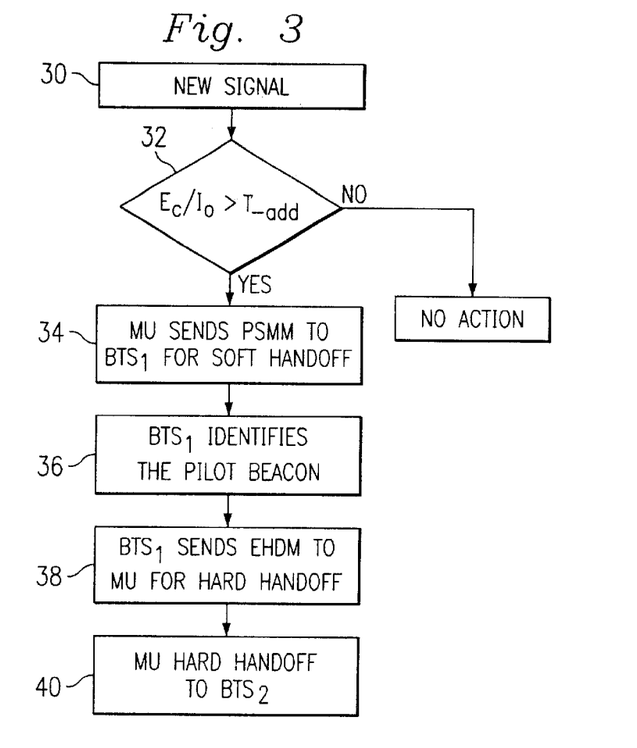
FIG. 3 is a flow diagram showing steps to complete a precise, active hard handoff in accordance with one embodiment of the present invention.

FIG. 2 shows a portion of the hardware configuration for facilitating an active hard handoff, i.e., a hard handoff when a MU carries an active conversation, using a pilot beacon distributor. FIG. 3 is a flow diagram showing steps taken by one or more components of FIG. 2 to complete the active hard handoff. As is known in the art, each established down link using CDMA technology has four communication channels—pilot, synch, paging, and traffic. The traffic channel carries the regular data information such as those for a telephone conversation. A pseudo-random noise (PN), which is encoded and transmitted with the pilot signal in the pilot channel by every BTS, has a phase shift from the same PN transmitted by a neighboring BTS. While a MU is in use, it is aware of the existence of its neighboring BTSs by sorting the PN information of any received pilot signals. If a critical parameter $E_c/I_0$ (where $E_c$ is the energy of the expected signal and $I_0$ is the total energy of everything received) of a pilot signal transmitted by a neighboring BTS is found to be higher than a predetermined threshold value, the MU perceives that the neighboring BTS is a possible candidate for handoff.

When the MU 22 is active under the coverage of the BTS1 24, which uses the carrier frequency F1, and moves into the coverage area of the outbound pilot beacon distributor 20 while leaving the campus 10, the MU receives a new pilot signal transmitted by the pilot beacon distributor 20. The new pilot signal has a carrier frequency of F1 but with a different PN, as illustrated in step 30 of FIG. 3. If the MU 22 calculates the parameter $E_c/I_0$ and finds that the value of the parameter $E_c/I_0$ has not exceeded the threshold value, in step 32, as known in the art according to the IS-95 standard, no action will be taken.

If the parameter $E_c/I_0$ is greater than the threshold value, and since the new pilot signal uses the same frequency F1, the MU 22 believes that a soft handoff should be the appropriate way to switch over the service. Thus, in step 34, it sends a Pilot Strength Measurement Message (PSMM) to BTS1, which is its current home base, asking for permission to complete a soft handoff. Once BTS1 receives the message in step 36, it searches for the identification of the PN of the new signal in a pilot signal database.

Since a distinctive PN phase shift can be encoded for the pilot beacon, BTS1 can quickly realize that the new pilot signal the MU 22 has just received is not initiated from a standard BTS, but it is a pilot beacon instead. Further, information relating to that particular PN in the database also informs BTS1 that the MU 22 needs a hard handoff to shift the carrier frequency from F1 to F2, which is used by the BTS2 26. Therefore, in step 38 of FIG. 3, BTS1 24 sends an Extended Handoff Direction Message (EHDM) to the MU 22 instructing it to prepare for a hard handoff to F2 under the coverage of BTS2 26. Once the MU 22 decodes the message, it reaches for BTS2 and carries out the handoff in step 40. Similar hard handoff mechanisms are expected when the MU 22 moves from the outside network to the campus 10 through the coverage area of the inbound pilot beacon distributor 18.

Figure 4:
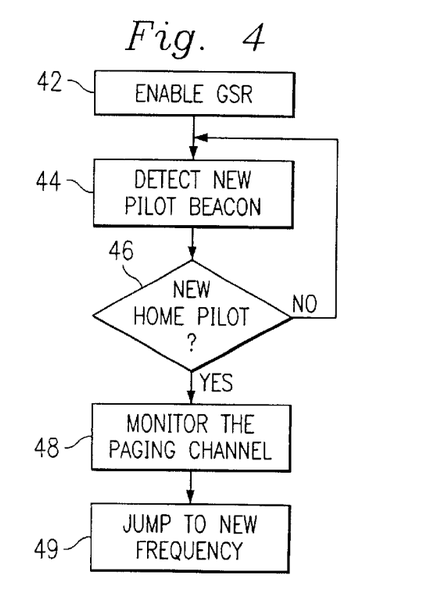
FIG. 4 is a flow chart for an idle hard handoff in accordance with one embodiment of the present invention.

FIG. 4 is a flow chart illustrating the steps involved for an idle hard handoff. When the MU 22 is powered on but idle, i.e., no active conversation is conducted, an idle hard handoff mechanism must take place during the transition from the campus network to the surrounding network (or vice versa). It is known in the art that an idle MU recognizes one BTS as its home base although it is not using the home base BTS to service any active conversation. The pilot signal of this home base BTS is thus closely monitored. Further, the MU may constantly search for new pilot signals. In order to steer the transition, in step 42, a Global Service Redirection (GSR) parameter is enabled in the paging channels of the two pilot beacons transmitted by the pilot beacon distributors 18 and 20. The GSR setting, if read by the MU 22, can force a transition to a particular carrier frequency.

In step 44, when the MU 22 moves close to the pilot beacon distributor 20, it should "see" a new pilot signal immediately because of its pilot searching function. As shown in step 46, according to the IS-95 standard, unless the parameter $E_c/I_0$ of the new found pilot signal is 3 dB stronger than the incumbent one, the MU 22 will not take any further actions. If the 3 dB condition is met, the MU 22 replaces the incumbent pilot signal that it is monitoring with the new pilot signal. By doing so, the MU 22 takes on the new BTS (the pilot beacon distributor 20) as its home base for the time being. Then, in step 48, the MU 22 reads the synch and paging channels of the new link, and immediately finds a GSR setting in the paging channel. The GSR setting instructs the MU to further handoff to the target carrier frequency F2. The MU 22 is to follow the instruction of the GSR, in step 49, and complete the hard handoff to F2. Similar idle hard handoff steps are taken using a pilot beacon transmitted by the pilot beacon distributor 18 when the MU 22 moves in the opposite direction.

For implementing certain embodiments of the present invention, beacon antennas in the pilot beacon distributors must be set low enough to avoid "overshooting" the pilot beacon signals. An antenna of about 5 feet in height, and with a low power consumption of about 0.01 mW is suitable to cover a regular two lane entrance to a parking lot of the campus.

Figure 5:
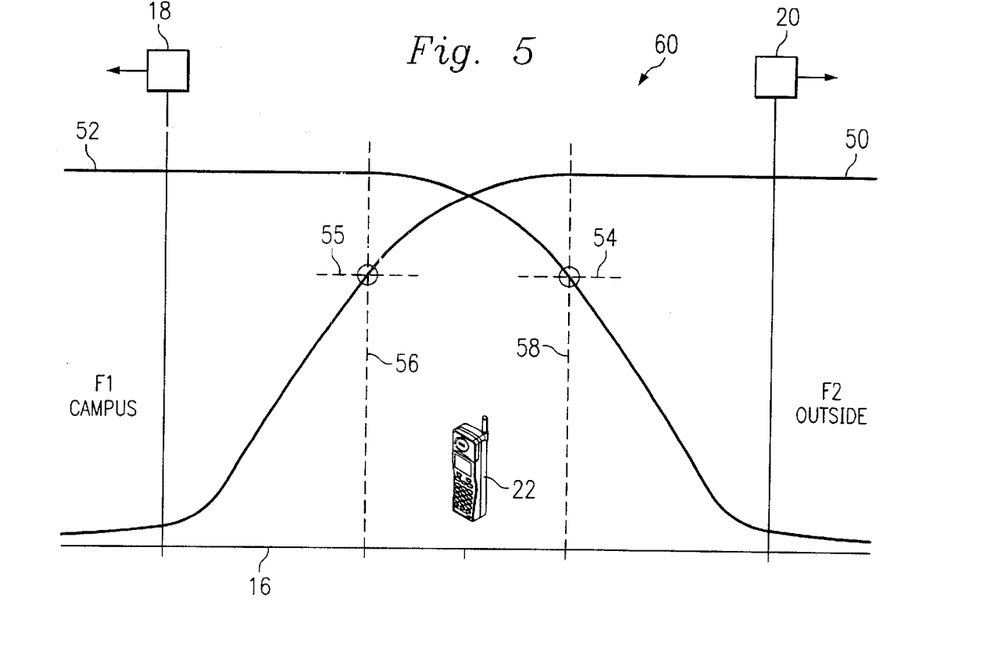
FIG. 5 demonstrates a possible ping-pong phenomenon associated with the hardware configuration of FIG. 1.

FIG. 5 presents a demonstration of a possible ping-pong phenomenon associated with some embodiments of the hardware configuration of FIG. 1. In FIG. 5, a plot of the parameter $E_c/I_0$ is superimposed on a drawing of the entrance of the campus. The ping-pong phenomenon occurs due to the hardware configuration of two pilot beacon distributors at the entrance area. In FIG. 5, a first curve 50 represents the level of the parameter $E_c/I_0$ for the pilot beacon of the outbound pilot beacon distributor 20, and similarly a second curve 52 for the inbound pilot beacon distributor 18. Two horizontal phantom lines 54 and 55 show the levels of the signal strength that trigger a hard handoff, and two vertical phantom lines 56 and 58 delineate an area between them that is susceptible to the ping-pong phenomenon. When the MU 22 is leaving the campus and passes line 56, according to the disclosure explained above, the pilot beacon distributor 20 will help to trigger a hard handoff to the surrounding network since the level of the parameter $E_c/I_0$ of the pilot signal has surpassed the threshold level as indicated by phantom line 55 in curve 50.

For the same reason, the MU 22 will be instructed to hard handoff in the area left of line 58, as shown in the figure, when it comes into the campus from outside. This leaves a small zone of uncertainty 60 between lines 56 and 58 where both pilot signals from the outbound pilot beacon distributor 20 and the inbound pilot beacon distributor 18 are above their corresponding thresholds. Thus the MU 22 is likely to "bounce" between these two handoffs without knowing which one to settle on. While it is bouncing, a ping-pong phenomenon occurs, and an active call can be dropped.

Another problem associated with some embodiments is that a hard handoff may fail in the entrance area 16 if the SNR of the current carrier frequency drops too fast. Referring to FIG. 2 again, since a hard handoff "drops" an old carrier frequency before it "grabs" a new one, the MU 22 would be in limbo. This is especially true if the current carrier frequency of BTS1 hades after the MU has sent the PSMM to BTS1 24 but prior to receiving the EHDM from BTS1 24. Consequently, the EHDM from BTS1 can never be received, and the handoff can never occur. For instance, it is likely that the MU has passed the outbound pilot beacon distributor 20 on its way out while still awaiting the EHDM message from the BTS1. Thus, referring back to FIG. 5, it is quintessential to provide a strong coverage of the current carrier frequency F1 in the area right of line 56, as shown in the figure, and even to the right of the outbound pilot beacon distributor 20 to help outgoing traffic. This is also true to provide an enhanced coverage of F2 in the entrance area left of line 58 and even left of the inbound pilot beacon distributor 18.

Another problem associate with some embodiments is that the target carrier may fail to provide a strong signal coverage in the border area. If the MU can not "grab" the target carrier frequency when it is so instructed, then the call can also be dropped since a service gap is created during the handoff.

One way to solve the ping-pong phenomenon is to use directional beacon antennas having a very large front-to-back signal ratio so that the signal strength of the pilot beacon drops very fast in the back lope direction of the pilot beacon distributors. Also, the beacon antennas for the inbound pilot beacon distributor 18 and the outbound pilot beacon distributor 20 can be set far apart so that the area of uncertainty 60 created by the overlap of the coverages from both of them does not exist. However, this approach may be impractical in cases where the entrance area 16 is relatively small.

Figure 6:
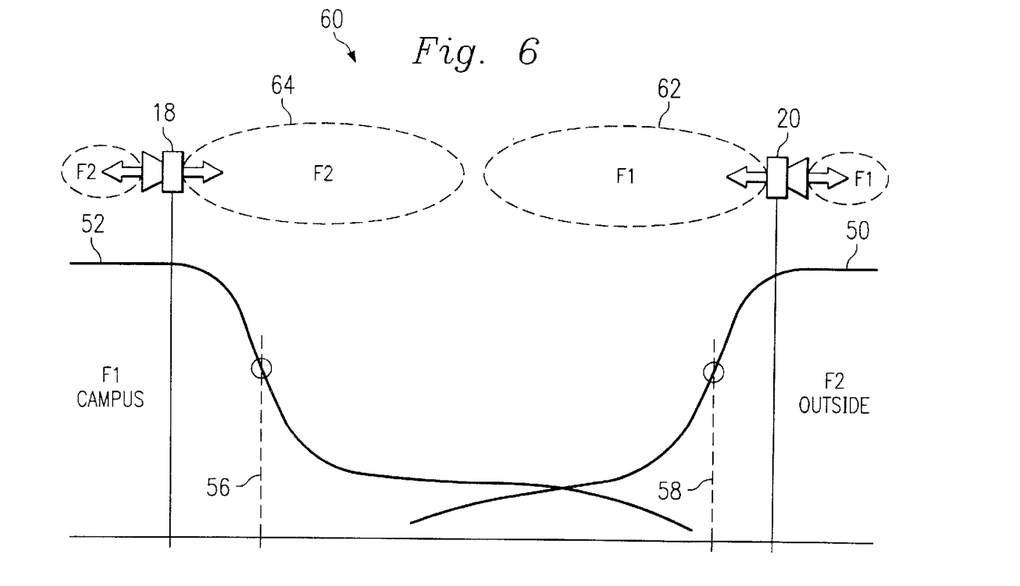
FIG. 6 shows one embodiment of the present invention using a directional non-beacon antenna in a back lobe direction of the beacon antenna of the pilot beacon distributors to enhance the system performance in accordance with one embodiment of the present invention.

FIG. 6 shows one embodiment of the present invention using a directional antenna in a back lobe of the beacon antenna in a pilot beacon distributor to improve the performance of the disclosed system. This configuration not only eliminates the ping-pong phenomenon, but also provides solutions to the other two performance problems mentioned above, i.e., the fast SNR change and the weak target carrier frequency problems.

In the pilot beacon distributor, 18 or 20, a directional beacon antenna having a high front-to-back signal ratio is chosen first. Another directional non-beacon antenna that does not have a high front-to-back signal ratio is also installed in a back lope direction of the beacon antenna. The coupling of these two antennas effectively reshapes the zone of uncertainty 60. As shown in FIG. 6, for example, a directional antenna 62 is installed to cover the opposite direction, or the back lobe direction of the beacon antenna in the pilot beacon distributor 20. The antenna 62 is a standard non-beacon antenna that uses F1 as the carrier frequency, and it does not have a high front-to-back signal ratio.

As mentioned early, the parameter $E_c/I_0$ represents the relative strength of the expected signal over the energy of overall signals received. A general mathematical formula as follows may clearly represent the relationship of the expected signal and the overall energy of signals received, and thus helps to understand the change done to curves 50 and 52 in FIG. 5 to form those in FIG. 6:

$$(E_c/I_o) = \frac{Signal_{exp}}{Signal_{exp} + Signal_{other}}$$

Logically, for a pilot beacon transmitted by the pilot beacon distributor 20, $$(E_c/I_o)_{Beacon} = \frac{Signal_B}{Signal_{Total}} = \frac{Signal_B}{Signal_B + Signal_{NB}}$$

where $Signal_B$ is the signal strength of the pilot beacon, $Signal_{Total}$ is the total energy of all received signals, and $Signal_{NB}$ is the signal strength of all non-beacon signals. And similarly for a non-beacon signal transmitted by the non-beacon antenna 62, $$(E_c/I_o)_{NonBeacon} = \frac{Signal_{NB}}{Signal_{NB} + Signal_B}$$

In the back lobe of the pilot beacon distributor 20, $Signal_{NB}$ significantly increases due to the transmission of the non-beacon antenna 62, which in turn increases the value of the denominator of the fraction and thus reduces the total ratio of the parameter $E_c/I_0$ for the pilot beacon in this direction. In a graphical representation, curve 50 and 52 drop sharply between the phantom lines 56 and 58. The intersection point of line 56 and curve 52 along with that of lines 58 and curve 50 represent two threshold points above which a handoff is triggered. By installing such a directional non-beacon antenna in the back lope direction of each beacon antenna in the pilot beacon distributors, the zone of uncertainty 60 no longer exists since it becomes an area that none of the pilot beacon distributors will trigger a hard handoff. As a result, the sharpness of the falling edge of curve 52 and the rising edge of curve 50 predominantly determines the precision of the handoff.

Another advantage of this configuration is that the location of lines 56 and 58 can be adjusted based on a careful selection of the directional non-beacon antennas 62 and 64.

Another advantage of this arrangement is that by installing the directional antennas 62 and 64 for transmitting regular non-beacon signals, they could be used to boost the signal strength of their corresponding carrier frequencies. Thus, the non-beacon antenna 62 can be configured to use F1 as its frequency. As a result, it can help the private network on the campus to fully support the wireless service to the entrance area until a hard handoff is triggered. Similarly, the non-beacon antenna 64 can use F2 as its carrier frequency to boost the signals transmitted by the surrounding network too. For instance, when the coverage of the carrier frequency F1 is strengthened in the entrance area, an exiting MU 22 is unlikely to have its wireless service dropped since it has ample time to receive the EHDM from its current BTS. Since the non-beacon antenna 62 does not have a high front-to-back ratio, its coverage extends to the right of the outbound pilot beacon distributor 20, and thus the MU can be passing beyond the outbound pilot beacon distributor 20 and still receive the EHDM.

Still another advantage is that this arrangement eliminates the problem when a weak coverage of the target frequency abandons the MU and renders the handoff incomplete. The non-beacon antenna 62, at the carrier frequency F1, also serves to enhance the coverage area of the target frequency F1 for any MU entering the campus through the entrance. Likewise, the non-beacon antenna 64 at the carrier frequency F2 boosts the signal strength of the surrounding network around the entrance for any outgoing MU to handoff properly.

Figure 7:
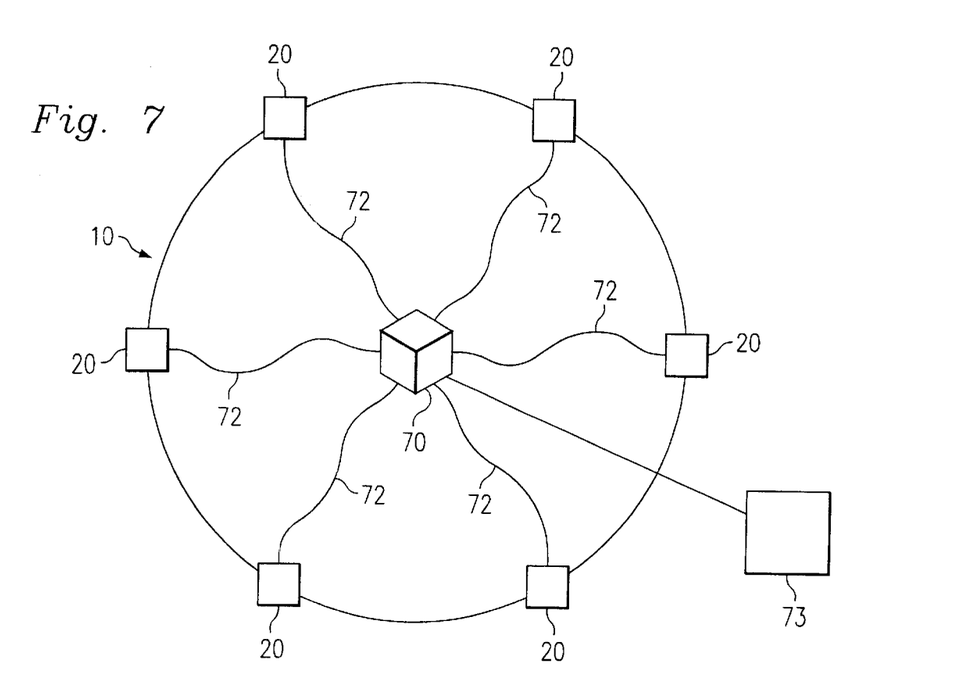
FIG. 7 is an overview of hardware arrangement of a plurality of pilot beacon distributors and a pilot beacon source.

FIG. 7 shows a layout of a fiber optical pilot beacon distribution system according to one embodiment of the present invention. For the campus 10 having a private network, a RF beacon source 70 distributes pilot beacons to the pilot beacon distributors 20 at every entrance of the campus through a plurality of fiber optical cables 72. Existing fiber distribution systems that are commercially available, such as BriteCell manufactured by the Allen Telecom Company, can be used for the implementation of the present invention. The beacon source 70 can also be a beacon hub connecting to a beacon source 73 located outside the campus. The beacon source 73 can be installed among a plurality of private networks so that they can share the beacons of the same frequency through the beacon hub. This beacon sharing scheme further reduces the cost for installing the private network.

In some of the private networks, multiple carrier frequencies may be employed. It is also very likely that multiple carrier frequencies may be used by the surrounding networks. In order to carry out the precision handoff, a pilot beacon for each frequency is needed. One solution is to use commercially available pilot beacon units (PBU). However, if a private network has N numbers of carrier frequencies and the surrounding networks have M numbers of carrier frequencies, and the campus has K numbers of entrances, then the total number of PBUs that are necessary is (N+M)× K, which could add significant cost to the private network design. Unfortunately there has been no other alternative that is more reliable than using the pilot beacon to trigger the precision handoffs.

As it is also known in the art, various frequency hopping schemes are proposed to provide multiple pilot beacons. But the cost of such a scheme still remains expensive. What is needed is a simple and economical multiple-beacon generator.

Figure 8:
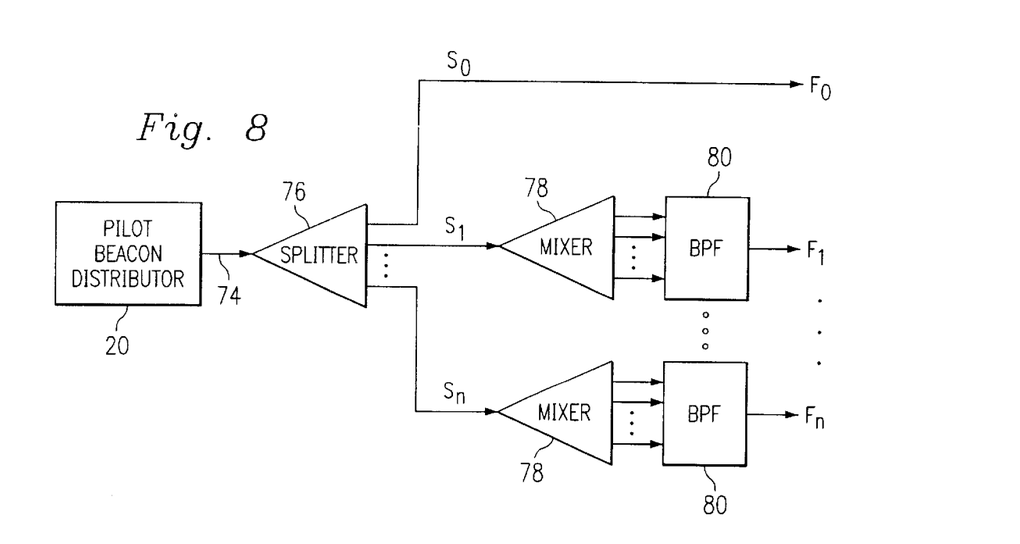
FIG. 8 illustrates one embodiment of the present invention for generating a plurality of pilot beacons using frequency division.

FIG. 8 shows a design of an economical multiple-beacon generator for generating a plurality of pilot beacons. As mentioned above, in a complex communication network, multiple carrier frequencies may be employed both for the private network and the surrounding networks. Since a pilot beacon is needed for each carrier frequency at each location, this limitation can greatly and rapidly increase the cost of the entire fiber optical pilot beacon distribution system when the networks expand to have more carrier frequencies. In order to control the cost and accommodate the interaction between a multiple-frequency private network and a multiple-frequency surrounding network, installation of excessive numbers of PBUs must be avoided. It is noticed that when a plurality of pilot beacons are deployed, all of them carry identical information being transmitted at different frequencies. Naturally, as long as multiple copies of a pilot beacon are produced for different carrier frequencies, they can satisfy the needs of the system in accordance with the teachings of the present invention.

A method to generate multiple pilot beacons at different frequencies from a pilot beacon is disclosed below. In this disclosure, only one PBU is needed no matter how many carrier frequencies are involved and how many entrances exit. An original pilot beacon at one frequency F at the pilot beacon distributor 20 is fed into a splitter 76 which clones N copies of the pilot beacon S0, S1 . . . Sn. Although these copies have a signal level 10×Log (N) dB lower than the original pilot beacon, the signal level is not a concern. Each of these clones, except S0, is further fed into a mixer 78. The mixer 78 creates intermediate signals at slightly different frequencies around the original frequency F. Subsequently, a band pass filter 80 is used to eliminate unwanted image frequencies to render a resultant pilot beacon at a distinct carrier frequency. Therefore, the resultant set of pilot beacons F1 . . . Fn, in conjunction with S0 which is now F0, have different frequencies that will not interfere with each other.

It is understood that the application of the above described fiber optical pilot beacon distribution system is not limited to hard handoffs between a private network on a campus and its surrounding networks. It can be applied wherever a precise hard handoff is desired.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for a precision hard handoff from a covering network having a first frequency to a target network having a second frequency, said covering network and said target network both using CDMA technology, said method comprising the steps of:

installing a plurality of pilot beacon distributors having paired directional antennas;

transmitting a pilot beacon signal from one of the pilot beacon distributors; and triggering a precision hard handoff of the mobile unit from the covering network to the target network by using the pilot beacon signal, wherein all the above steps are performed in a small border area between the covering network and the target network.

2. The method of claim 1 further comprising connecting a pilot beacon source to the pilot beacon distributors through a plurality of fiber optical cables.

3. The method of claim 1 wherein the paired directional antennas include a first directional antenna having a high front-to-back signal ratio for transmitting the pilot beacon signal and a second directional antenna for transmitting a non-beacon signal.

4. The method of claim 3 wherein the second directional antenna is coupled with the first directional antenna in a back lobe direction of the first directional antenna.

5. The method of claim 3 wherein both the first and the second directional antennas use the first frequency for transmissions.

6. The method of claim 1 wherein the step of triggering further includes the steps of:

receiving the pilot beacon signal by the mobile unit entering the border area;

negotiating a handoff with the covering network; and completing the precision hard handoff to the target network.

7. The method of claim 6 wherein, when the mobile unit is active, the step of negotiating further includes the steps of:

requesting a soft handoff to the covering network by the mobile unit;

identifying the pilot beacon by the covering network;

refusing the soft handoff by the covering network; and instructing the mobile unit to start the precision hard handoff to the target network.

8. The method of claim 6 wherein, when the mobile unit is idle, the step of negotiating further includes the steps of:

identifying the pilot beacon signal by the mobile unit;

reading the information in a paging channel by the mobile unit; and instructing the mobile unit to start the precision hard handoff to the target network by a pre-enabled Global Service Redirection parameter in the paging channel.

9. A method for a precision hard handoff of a mobile unit between a first CDMA communication network using a first frequency and a second CDMA communication network using a second frequency, the mobile unit using the first frequency if it is covered initially under the first network and using the second frequency if it is covered initially under the second network, the method comprising the steps of:

installing a first pilot beacon distributor for directing the precision hard handoff from the first network to the second network in a border area between the first and the second networks;

installing a second pilot beacon distributor for directing the hard handoff from the second network to the first network in the border area between the first and the second networks;

transmitting a first pilot beacon signal by the first pilot beacon distributor at the first frequency;

transmitting a second pilot beacon signal by the second pilot beacon distributor at the second frequency;

identifying the first pilot beacon signal by the mobile unit if the mobile unit moves from the first network to the second network;

identifying the second pilot beacon signal by the mobile unit if the mobile unit moves from the second network to the first network;

negotiating a needed handoff; and completing the precision hard handoff, wherein all the above steps are taken in a small border area between the first network and the second network.

10. The method of claim 9 wherein the step of installing a first pilot beacon distributor further includes the steps of:

installing a pilot beacon source for generating the first pilot beacon signal; and transmitting the first pilot beacon signal to the first pilot beacon distributor through a fiber optical cable.

11. The method of claim 9 wherein the step of installing a second pilot beacon distributor further includes the steps of:

installing a pilot beacon source for generating the second pilot beacon signal; and transmitting the second pilot beacon signal to the second pilot beacon distributor through a fiber optical cable.

12. The method of claim 9 wherein the first pilot beacon distributor includes a first directional antenna transmitting the first pilot beacon signals at the first frequency and a second directional antenna coupled in a back lobe direction of the first directional antenna transmitting other signals also at the first frequency.

13. The method of claim 12 wherein the first directional antenna has a high front-to-back signal ratio.

14. The method of claim 9 wherein the second pilot beacon distributor includes a first directional antenna transmitting the second pilot beacon signals at the second frequency and a second directional antenna coupled in a back lobe direction of the first directional antenna transmitting non-beacon signals at the second frequency.

15. The method of claim 14 wherein the first directional antenna has a high front-to-back signal ratio.

16. The method of claim 9 wherein, when the mobile unit is active and moving from the first network to the second network, the step of negotiating further includes the steps of:

requesting a soft handoff to the first network by the mobile unit;

identifying the first pilot beacon by the first network;

refusing the soft handoff by the first network; and instructing the mobile unit to start the precision hard handoff to the second network.

17. The method of claim 16 wherein the step of requesting includes sending a Pilot Strength Measurement Message to the first network by the mobile unit.

18. The method of claim 16 wherein the step of instructing includes sending an Extended Handoff Direction Message to the mobile unit by the first network.

19. The method of claim 9 wherein, when the mobile unit is active and moving from the second network to the first network, the step of negotiating further includes the steps of:

requesting a soft handoff to the second network by the mobile unit;

identifying the second pilot beacon by the first network;

refusing the soft handoff by the second network; and instructing the mobile unit to start the precision hard handoff to the first network.

20. The method of claim 19 wherein the step of requesting includes sending a Pilot Strength Measurement Message to the second network by the mobile unit.

21. The method of claim 19 wherein the step of instructing includes sending an Extended Handoff Direction Message to the mobile unit by the second network.

22. The method of claim 9 wherein, when the mobile unit is idle, the step of negotiating further includes the steps of:

identifying the first or the second pilot beacon signal by the mobile unit;

reading the information in a paging channel by the mobile unit; and instructing the mobile unit to start the precision hard handoff to the first or the second network determined by a pre-enabled Global Service Redirection parameter in the paging channel.

23. A system for directing a mobile unit to complete a precision hard handoff from a covering network having a first frequency to a target network having a second frequency, said covering network and said target network both use CDMA technology, said system comprising:

a plurality of pilot beacon distributors having paired directional antennas in a border area between the covering network and the target network for transmitting pilot beacon signals; and means for triggering a precision hard handoff of the mobile unit from the covering network to the target network by using one of the pilot beacon signals.

24. The system of claim 23 wherein the pilot beacon distributors are connected to a pilot beacon source through a plurality of fiber optical cables.

25. The system of claim 23 wherein the paired directional antennas include a first directional antenna having a high front-to-back signal ratio for transmitting the pilot beacon signal and a second directional antenna for transmitting non-beacon signals.

26. The system of claim 25 wherein the second directional antenna is coupled with the first directional antenna in a back lobe direction of the first directional antenna.

27. The system of claim 25 wherein both the first and the second directional antennas use the first frequency for transmissions.

28. The system of claim 23 whereby the mobile unit receives the pilot beacon signal in the border area, negotiates a handoff with the covering network, and completes the precision hard handoff to the target network.

29. The system of claim 28 whereby the mobile unit negotiates the handoff, when the mobile unit is active, comprising:

means for identifying the pilot beacon in response to a soft handoff request sent to the covering network;

means for refusing the soft handoff request; and means for instructing the mobile unit to start the precision hard handoff to the target network.

30. The system of claim 28 whereby the mobile unit negotiates the handoff, when the mobile unit is idle, comprising:

means for instructing the mobile unit to start the precision hard handoff to the target network by a pre-enabled Global Service Redirection parameter in a paging channel indicated by the pilot beacon signal.

31. A wireless communication system for providing high volume coverage inside a primary coverage area operating at a primary frequency, the system comprising:

at least one base station in the high volume coverage area operating at a second frequency; and a first pilot beacon distributor positioned at a transition point between the primary coverage area and the high volume coverage area for directionally transmitting a first pilot beacon signal into the high volume coverage area;

whereby a mobile unit operating on the primary frequency and traveling into the high volume coverage area can receive the first pilot beacon signal and shift operation to the second frequency when crossing the transition point.

32. The system of claim 31 further comprising:

a second pilot beacon distributor positioned at the transition point for directionally transmitting a second pilot beacon signal away from the high volume coverage area;

whereby a mobile unit operating on the second frequency and traveling out of the high volume coverage area can receive the second beacon signal and shift operation to the primary frequency when crossing the transition point.

33. The system of claim 31 wherein the first beacon signal operates at the primary frequency.

34. The system of claim 31 wherein the second beacon signal operates at the second frequency.

35. The system of claim 32 wherein the first and second beacon signal distributors are positioned at a distance to prevent a ping-pong phenomenon between the primary and second frequencies.

36. The system of claim 32 wherein the first beacon signal distributor has a first directional antenna having a high front-to-back signal ratio for transmitting the first pilot beacon signal and enhancing the coverage of the second frequency, and a second directional antenna coupled in a back lobe direction of the first directional antenna for improving the precision of the hard handoff, eliminating a ping-pong phenomenon, and enhancing the coverage of the primary frequency.

37. The system of claim 32 wherein the second beacon signal distributor has a first directional antenna having a high front-to-back signal ratio for transmitting the second pilot beacon signal and enhancing the coverage of the second frequency, and a second directional antenna coupled in a back lobe direction of the first directional antenna for improving the precision of the hard handoff, eliminating a ping-pong phenomenon, and enhancing the coverage of the primary frequency.

* * * * *